(12) United States Patent
Ewing, Jr.

(10) Patent No.: US 7,896,620 B1
(45) Date of Patent: Mar. 1, 2011

(54) INTEGRAL GAS TURBINE COMPRESSOR AND ROTARY FUEL INJECTOR

(75) Inventor: Joseph H. Ewing, Jr., Jupiter, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 1009 days.

(21) Appl. No.: 11/709,388

(22) Filed: Feb. 22, 2007

(51) Int. Cl.
    *F02C 1/00* (2006.01)
    *F02C 7/22* (2006.01)
    *F03B 3/12* (2006.01)
    *F01D 5/14* (2006.01)

(52) U.S. Cl. .............. 416/231 R; 416/181; 60/744; 60/776

(58) Field of Classification Search .......... 239/533.2, 239/533.1; 416/181, 231 R; 60/740, 739, 60/744, 745, 776
See application file for complete search history.

(56) References Cited

U.S. PATENT DOCUMENTS

| | | | |
|---|---|---|---|
| 2,568,921 A | | 9/1951 | Kroon |
| 2,595,505 A | | 5/1952 | Bachle |
| 2,602,292 A | | 7/1952 | Buckland et al. |
| 2,924,937 A | * | 2/1960 | Leibach .................. 60/804 |
| 3,921,393 A | | 11/1975 | Bracken, Jr. |
| 3,932,988 A | | 1/1976 | Beaufrere |
| 3,933,133 A | | 1/1976 | Shekleton |
| 4,040,251 A | | 8/1977 | Heitmann et al. |
| 4,232,526 A | * | 11/1980 | Barbeau .................. 60/745 |
| 4,255,935 A | * | 3/1981 | Morishita ................ 60/745 |
| 4,257,236 A | * | 3/1981 | Morishita ................ 60/745 |
| 4,343,147 A | | 8/1982 | Shekleton |
| 4,429,527 A | | 2/1984 | Teets |
| 5,022,228 A | | 6/1991 | Hoopes et al. |
| 5,823,443 A | * | 10/1998 | Cooper et al. ........... 239/533.9 |
| 6,966,174 B2 | * | 11/2005 | Paul ...................... 60/226.1 |
| 6,983,606 B2 | | 1/2006 | Brown |
| 2007/0234725 A1 | * | 10/2007 | Critchley et al. ............. 60/744 |

* cited by examiner

*Primary Examiner*—Michael Cuff
*Assistant Examiner*—Gerald L Sung
(74) *Attorney, Agent, or Firm*—John Ryznic (57) ABSTRACT

An integral impeller and fuel pump for a small gas turbine engine, the impeller being a centrifugal impeller to supply compressed air to the combustor, the rotor disk of the centrifugal compressor having at least one radial fuel passage connecting a central bore of the rotor disk to a fuel nozzle located on the rear face of the rotor disk. A low pressure fuel supplied by a small pump delivers the fuel to the central bore where the fuel is collected within helical grooves and channeled into the radial fuel passages where the fuel is pressurized to a relatively high pressure due to the high rotational speed of the centrifugal compressor. Highly compressed fuel is injected into the combustor through fuel nozzles in an axial direction as the rotor disk rotates. Helical grooves in the central bore each connected to a radial fuel passage move the fuel to an opposite side of the central bore to counteract rotor imbalance. In another embodiment, a primary annular groove collects fuel and, at a low speed, passes all of the fuel to a first radial fuel passage into a first fuel nozzle such that only some of the fuel nozzles inject fuel into the combustor. At a higher speed, some of the fuel collected in the primary annular groove is spilled over into a secondary annular groove that passes the spilled-over fuel into a second radial passage and second fuel nozzle such that all of the fuel nozzles inject fuel into the combustor.

22 Claims, 7 Drawing Sheets

INTEGRAL GAS TURBINE COMPRESSOR AND ROTARY FUEL INJECTOR

BACKGROUND OF THE INVENTION

1. Field of the Invention

The present invention relates generally to a gas turbine engine, and more specifically to an integral compressor and centrifugal fuel pump.

2. Description of the Related Art Including Information Disclosed Under 37 CFR 1.97 and 1.98

A small gas turbine engine operates at a very high rotational speed because of its size. A fuel is mixed in the combustor with pressurized air and burned to produce a hot gas flow which is then passed through the turbine to drive the compressor and a bypass fan if used. Some prior art engines use a plurality of individual fuel injectors spaced around the combustor and inject fuel directly into the combustor. Enough injectors are required so that a fairly even combustion pattern is created within the combustor. Using many injectors will also increase the cost and complexity of the engine.

Some prior art small gas turbine engines use a slinger to compress and sling the fuel into the combustor in a radial outward direction. A slinger delivers the fuel into the combustor around a full 360 degree pattern (referred to as a zero pattern factor) so that a uniform distribution of fuel in the circumferential direction is formed. However, the slingers do not pressurize the fuel to a high pressure. High fuel pressure would help to atomize the fuel to a fine mist which would help to improve combustion efficiency.

Another problem found in a small gas turbine engine is the difficulty of providing a fuel pump that can supply adequate fuel pressure at the very low fuel flow rates inherent in a small thrust turbine engine.

U.S. Pat. No. 6,983,606 B2 issued to Brown on Jan. 10, 2006 and entitled INTEGRATED GAS TURBINE COMPRESSOR-ROTARY FUEL INJECTOR discloses a small gas turbine engine with a centrifugal compressor having a contoured rear surface extending inboard and terminating at a lip to form a surface on which a fuel is forced along the surface and into the combustor in an axial direction. Rotation of the centrifugal compressor forces the fuel along the surface and into the combustor. Since the surface over which the fuel passes is uncovered, the pressure of the fuel is not increased very much.

Another problem with small gas turbine engines is in atomization of the fuel. The fuel must be broken up into very fine particles of fuel in order to burn fast in the combustor. Large particles will take longer to burn and therefore require a longer combustor in order to allow for enough time for the large fuel particles to burn completely before passing into the turbine section. However, forming small droplets of fuel require higher pressures than would be produced in the prior art engines. Larger engines can make use of separate high pressure fuel pumps to provide the higher pressures required for adequate atomization of the fuel. However, adding additional parts such as separate fuel pumps add weight and size, as well as complexity, to small a gas turbine engine. In the case of a cruise missile, eliminating unnecessary space and weight would allow for more fuel to be carried, resulting in longer range or increased loiter time.

U.S. Pat. No. 2,568,921 issued to Kroon on Sep. 25, 1951 and entitled COMBUSTION CHAMBER WITH ROTATING FUEL NOZZLES discloses a gas turbine engine with a rotary ducted impeller element carried on the rotary shaft that has four fuel nozzles at the duct end to inject fuel into the combustor in the axial direction of flow. The rotary ducted injector is capable of rotating at 12,000 rpm to produce a fuel pressure at the nozzles in excess of 3,000 psi to sufficiently atomize the fuel. Fuel is pumped under low pressure into a collecting chamber at the inlet of the radial ducts. One problem with the rotary ducted injector of the Kroon invention is that the injectors and radial ducts are located within the hot combustor, exposing the fuel injector assembly to the extreme high temperature environment of the combustor. This would most likely lead to coking of the hydrocarbon fuel within the fuel passages and subsequent restriction or plugging of the fuel flow. Another problem with the Kroon invention is the use of a radial ducted fuel injector which can be affected by rotor imbalance forces leading to further imbalance. This is because the rotor of any machine is not perfectly balanced. The geometric center of the rotating member will not be the center of rotation due to mass imbalance inherent in any imperfect part. Without a compensating fuel feed system, the Kroon invention would likely cause significant rotor dynamics problems and would not work in a real engine.

An object of the present invention is to provide for a high pressure fuel injector in a small gas turbine engine without requiring a massive and heavy fuel pumping system.

Another object of the present invention is to modify a centrifugal compressor of a gas turbine engine such that the compressor can also be used to pressurize and deliver the fuel to the combustor.

Another objective of the present invention is to provide for improved balance to a rotating injector of the prior art.

BRIEF SUMMARY OF THE INVENTION

In a gas turbine engine, an integral centrifugal compressor and fuel injector in which a fuel is introduced into a bore of the impeller and passes into a plurality of fuel passages extending substantially in a radial direction such that rotation of the impeller also pressurizes the fuel within the passages. At the end of the passages are fuel nozzle inserts that inject the pressurized fuel in an axial direction into the combustor. Because the integral impeller and fuel injector is rotating during operation, a uniform circumferential distribution of fuel is sprayed into the combustor. The very high centrifugal forces produce a very high fuel pressure. The high delta pressure across the fuel nozzles produces a rapid and effective fuel atomization and improved combustion. Fuel is channeled along the bore through helical grooves and into the radial passages such that the mass imbalance inherent in the rotor can be counteracted by the distribution of more fuel to the fuel passages opposite to the imbalance so that the rotor is more balanced.

DETAILED DESCRIPTION OF THE INVENTION

Figure 1:
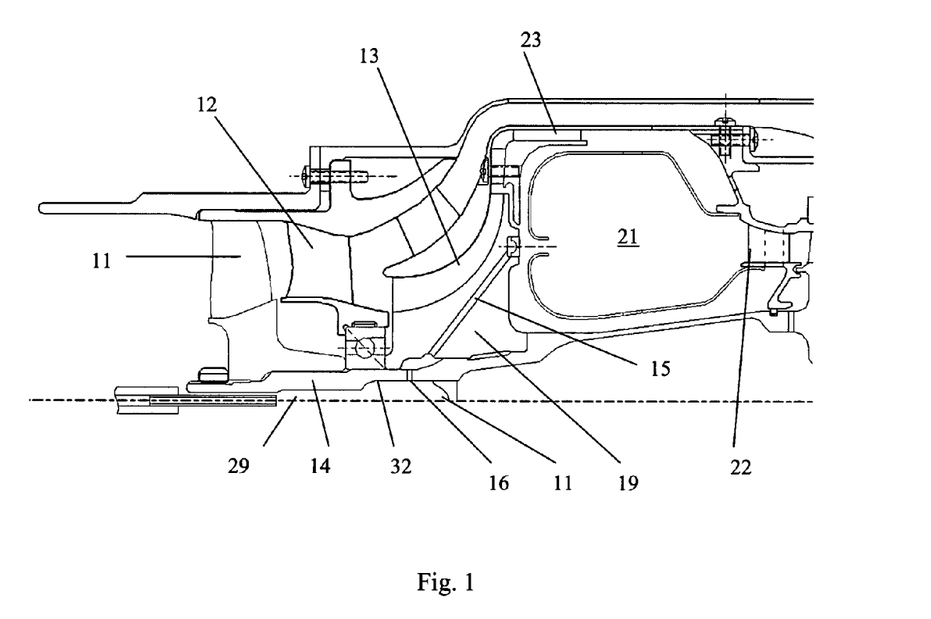
FIG. 1 shows a cross section view of a gas turbine engine with the integral impeller and fuel injector of the present invention.
Figure 2:
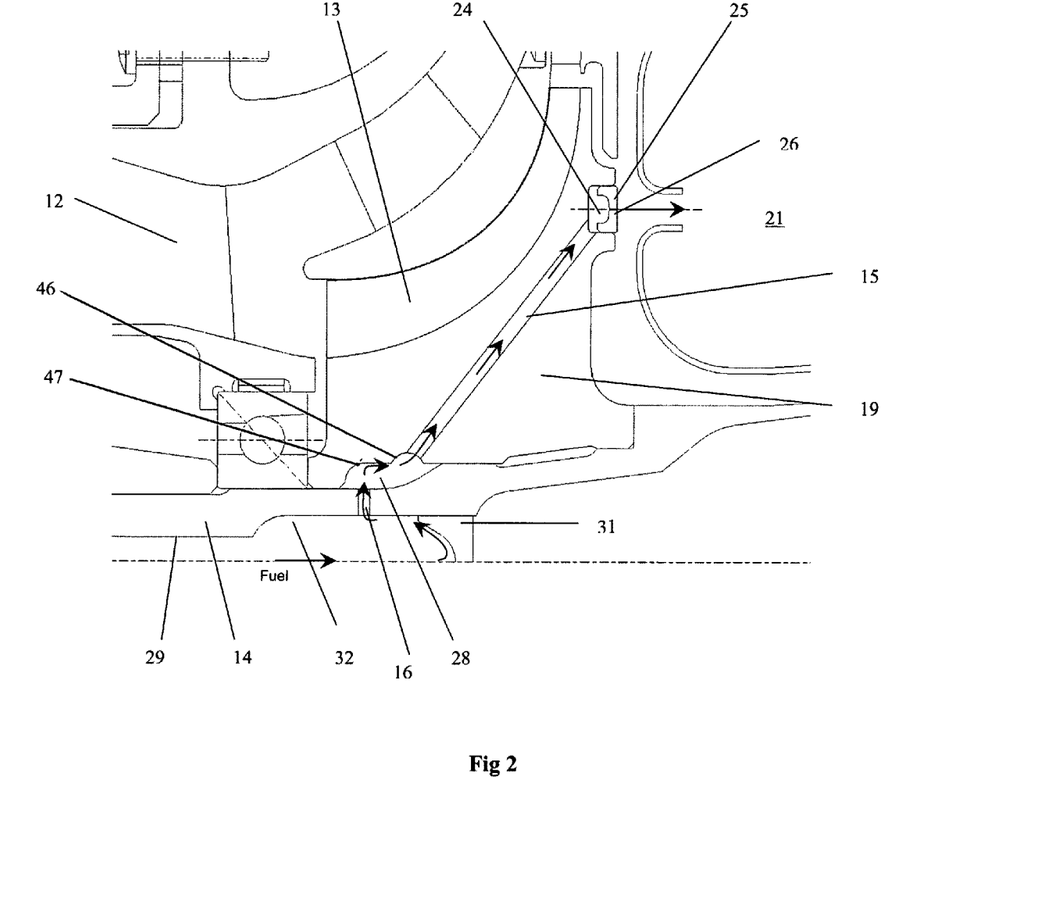
FIG. 2 shows a close-up view of the integral impeller and fuel injector of the present invention shown in FIG. 1.

FIG. 1 shows a small 30 lb thrust gas turbine engine of the present invention. The engine includes a rotor shaft 14 with a fan blade 11 on an upstream end and a centrifugal compressor 13 located between the fan blade 11 and the combustor 21. A guide vane 12 extends from the casing and supports a front bearing that supports the rotor shaft 14. The centrifugal impeller 13 includes a plurality of fuel passages 15 formed in the rotor 19 and extending from an inner surface of the impeller and upward in a radial direction and toward the rear of the impeller rotor disk 19, leading into an opening 24 facing rearward toward the combustor 21. The rotor shaft 14 is hollow to provide for a fuel delivery passage from a fuel tank. FIG. 2 shows a more detailed view of the integral impeller and fuel injector. The rotor disk 19 of the impeller 13 includes four of the passages 15 extending from a groove 27 on the inlet end of the passage. A space 28 is formed between the rotor disk 19 of the impeller 13 and the rotor shaft 14. One or more radial passages 16 are located in the rotor 14 to provide for a fuel communication between the space 28 and the enlarged bore area 32 of the rotor shaft 14. A splash cup 31 redirects the aft flowing fuel from the low pressure injector radially outward and forward to the enlarged bore area 32. The passages 15 each lead into an opening 24 formed on the rear face of the rotor disk 19 for the fuel to accumulate. A fuel nozzle insert 25 having a injector hole therein 26 is brazed to the opening 24 to secure the insert 25 within the opening 24. The injector hole 26 is directed in the axial direction of the engine to inject the fuel into the combustor 21. The number of passages 15 and nozzle inserts 25 used can vary depending upon the engine requirements. Two to four passages and inserts should work in a small gas turbine engine.

A fuel is supplied to the central bore 29 of the rotor shaft 14 through a low pressure fuel injector as shown in FIG. 1. The low pressure fuel injector is connected to a fuel tank and low pressure fuel pump (e.g., a simple low powered electric pump). A fuel stream is directed down the bore 29 and onto the splash cup 31 which is attached to the rotor shaft 14 and rotates with it. Contact with this rotating surface imparts rotational velocity to the fuel. This produces centrifugal forces which cause the fuel to flow radially outward. The splash cup 31 forces the fuel outward and then forward onto the enlarged bore area 32. A layer of fuel will lay on this surface 32 as it flows into the radial passage(s) 16 and then into space 28. The fuel flowing thru the radial passage(s) 16 will form jets that will impinge on the bore 45 of the impeller rotor disk 19. These fuel jets will spread somewhat radially and circumferentially over the surface, eventually flowing into the bore fuel collection groove 46. The groove 46 allows for the fuel from the discrete jets flowing thru passage(s) 16 to collect and spread circumferentially. This provides a more uniform distribution of fuel to feed the radial fuel passages 15.

The embodiment of the present invention in FIG. 1 uses a single spool for a small gas turbine engine of about 30 lbs thrust. The integral impeller and fuel pump is part of a two stage fuel pump system in which the first stage would include a low pressure fuel pump. A simple electric pump would provide an accurate flow of fuel at relatively low flow rates. This low pressure fuel would be injected at the centerline of the rotor (within the bore of the rotor shaft 14) as shown in FIG. 1 through a low pressure fuel injector. The second stage of the pump system is shown in FIG. 2. Contact of the fuel with the rotating surfaces will centrifuge the fuel to flow radially outward through the fuel passages 15 and toward the fuel nozzles 25. The centrifugal forces on the rotating column of fuel in the fuel passages 15 can produce very large fuel pressures. This forces fuel at a high velocity through small diameter orifices 26 in the brazed nozzle inserts 25.

Figure 3:
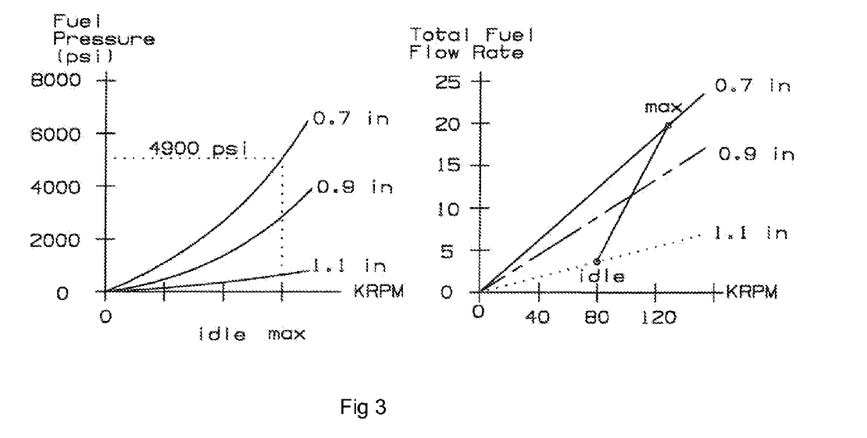
FIG. 3 shows a cross section view of the impeller/fuel injector with a supply of fuel in the upper half of the passage.
Figure 4:
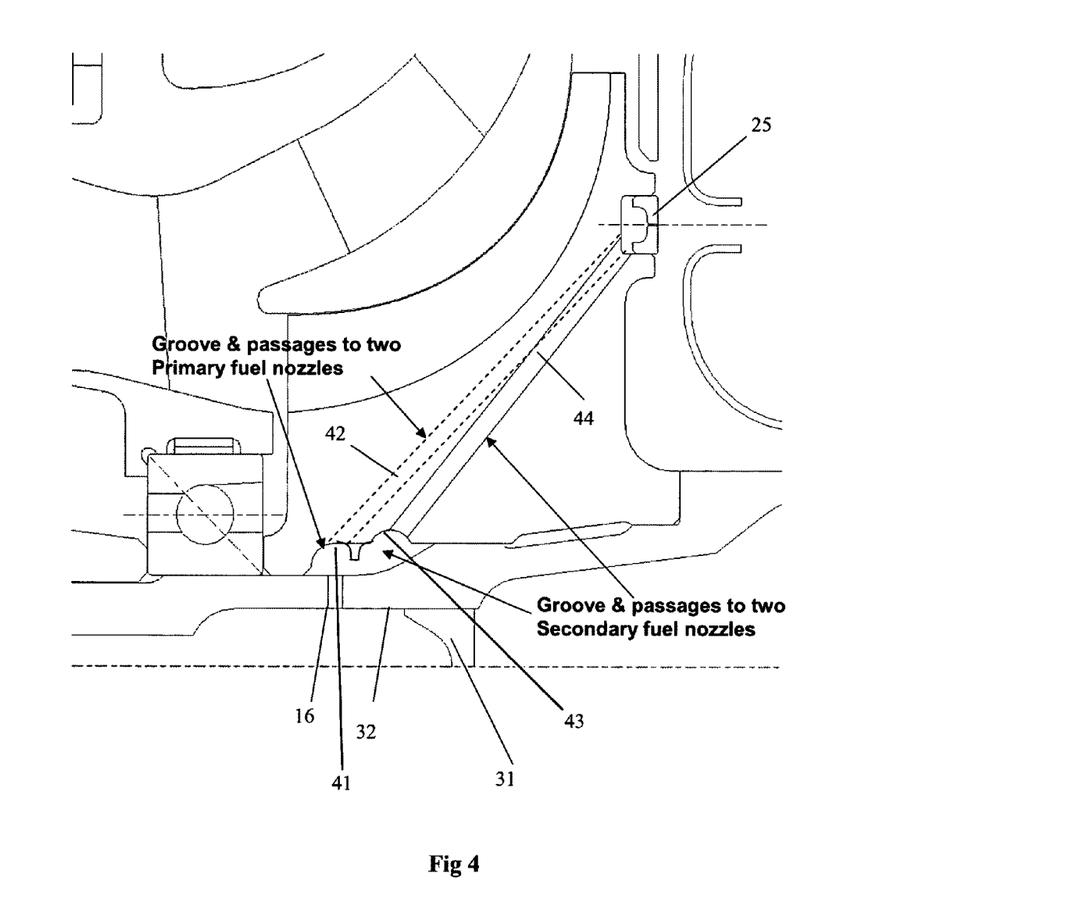
FIG. 4 shows a cross section view of a second embodiment of the integral impeller and fuel injector of the present invention that permits fuel staging.

As seen in FIG. 3, the inner radius ($r_i$) of the fuel column within the passage 15 controls the fuel pressure which controls the fuel flow rate and thus the rotor speed. An engine controller would sense the rotor speed and increase or decrease the fuel flow until a desired inner radius (i.e. rotor speed) is achieved. At maximum power with the fuel at 4,900 psi and a fuel ejection speed of Mach 2.6, effective fuel atomization is achieved. At idle flow rates, the inner radius—and thus the fuel pressure—must be rather low since flow rate is driven by pressure. This could result in atomization and ignition issues during start-up. The present invention uses four nozzles. The fuel pressure can be increased by a factor of 4 or 5 if the flow is split between two sets of fuel nozzles. This is easily achieved by staging the fuel delivery. FIG. 4 shows a second embodiment of the present invention that will achieve this objective. The fuel introduced into the bore of the impeller would first pool in a forward or primary fuel collection groove 41 and feed two (primary) fuel nozzles thru two primary fuel passages 42 during operation at idle and low fuel flow rates. As the fuel flow rate is increased, the fuel will overflow from the first groove 41 and pool in the aft or secondary fuel collection groove 43 as well. This will start feeding the two remaining (secondary) fuel nozzles thru the two secondary fuel passages 44.

A further benefit of the present invention is a zero pattern factor. The rotating fuel nozzles will provide an essentially uniform distribution of fuel circumferentially. This helps reduce the cooling air requirements to the static hot section parts such as the combustor, the vanes and the blade outer air seals (BOAS).

Figure 5:
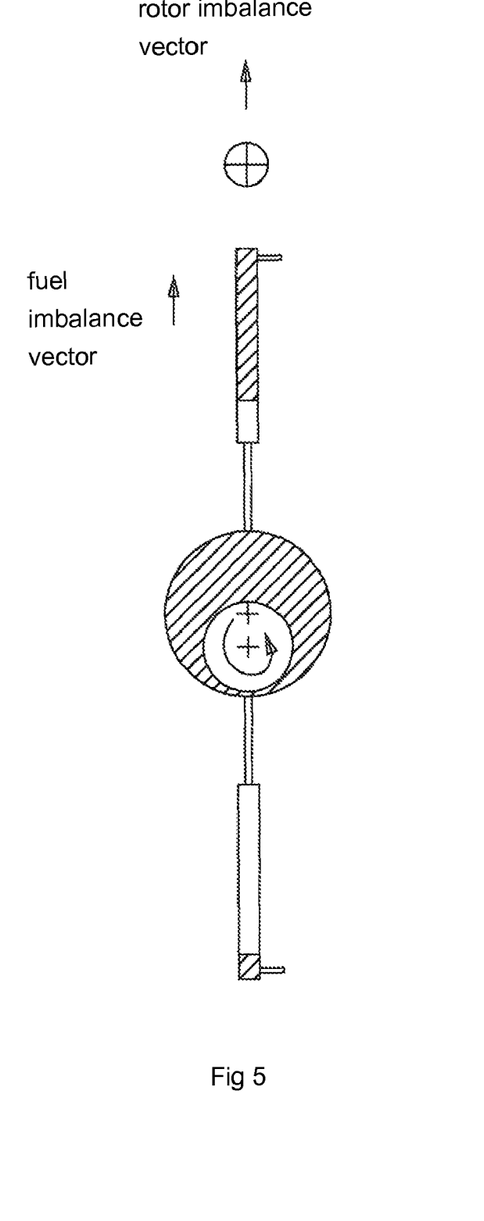
FIG. 5 shows a representation of fuel imbalance resulting from an integral impeller and fuel injector without the use of helical grooves in the bore.

Rotor imbalance is a factor that must be considered with the integral impeller and fuel injector of the present invention. The impeller in FIGS. 1 and 2 allow the fuel to centrifuge outward and accumulate as a layer on the impeller bore 45 and fuel collection groove 46 before flowing into the fuel passages 15. This accumulation will be affected by rotor imbalances. The geometric center of the impeller will not be the center of rotation of the rotor due to mass imbalance inherent in any "imperfect" part. The geometric center may be offset one mil (0.001 inch) or more from the rotational center. This will cause more fuel to pool or accumulate on the side of the rotor toward the imbalance vector as seen in FIG. 5. This would result in more fuel being fed to the fuel passages on the side of the rotor with the imbalance, making the imbalance even worse. One method of preventing this added imbalance, as well as counteracting the inherent rotor imbalance, is with the use of the helical grooves of 180 degrees represented in FIG. 6. The fuel is directed through the helical passages cut into the bore of the impeller. The greater volume of fuel that pools on the imbalance side of the bore will be forced to flow to the opposite side of the rotor. The greater volume of fuel will now fill a fuel passage substantially opposite the rotor imbalance vector and tend to balance the rotor. Use of the helical grooves will always produce a net imbalance less than the initial inherent rotor imbalance due to an "imperfect" rotor. This imbalance compensation feature specifies helical grooves. These are the most efficient and most easily manufactured way to route fuel 180 degrees to the opposite side of the rotor. However, other groove geometry could also be used, such as a series of axial and circumferential grooves in a zigzag pattern.

Figure 6:
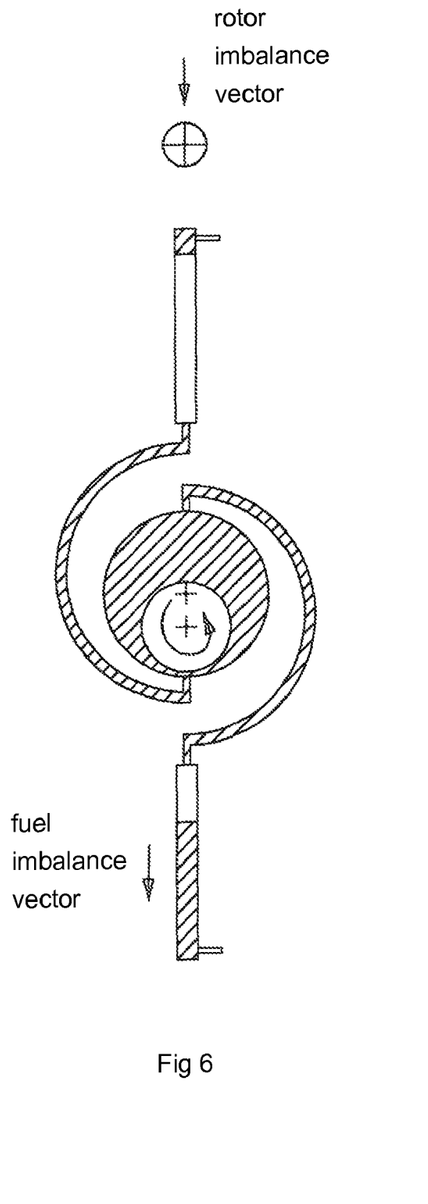
FIG. 6 shows a representation of rotor imbalance compensation resulting from an integral impeller and fuel injector with the use of helical grooves in the bore.
Figure 7:
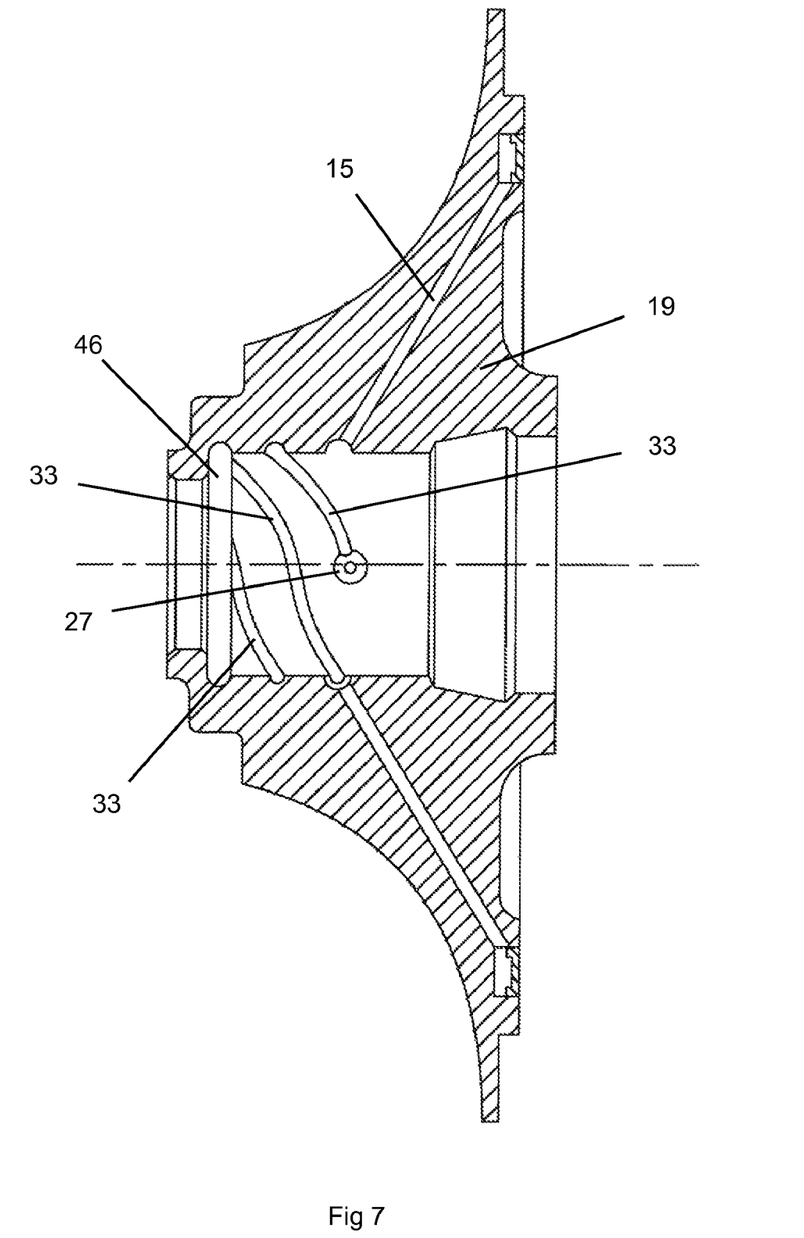
FIG. 7 shows a cut-away view of the integral impeller and fuel injector with the helical grooves in the bore.
Figure 8:
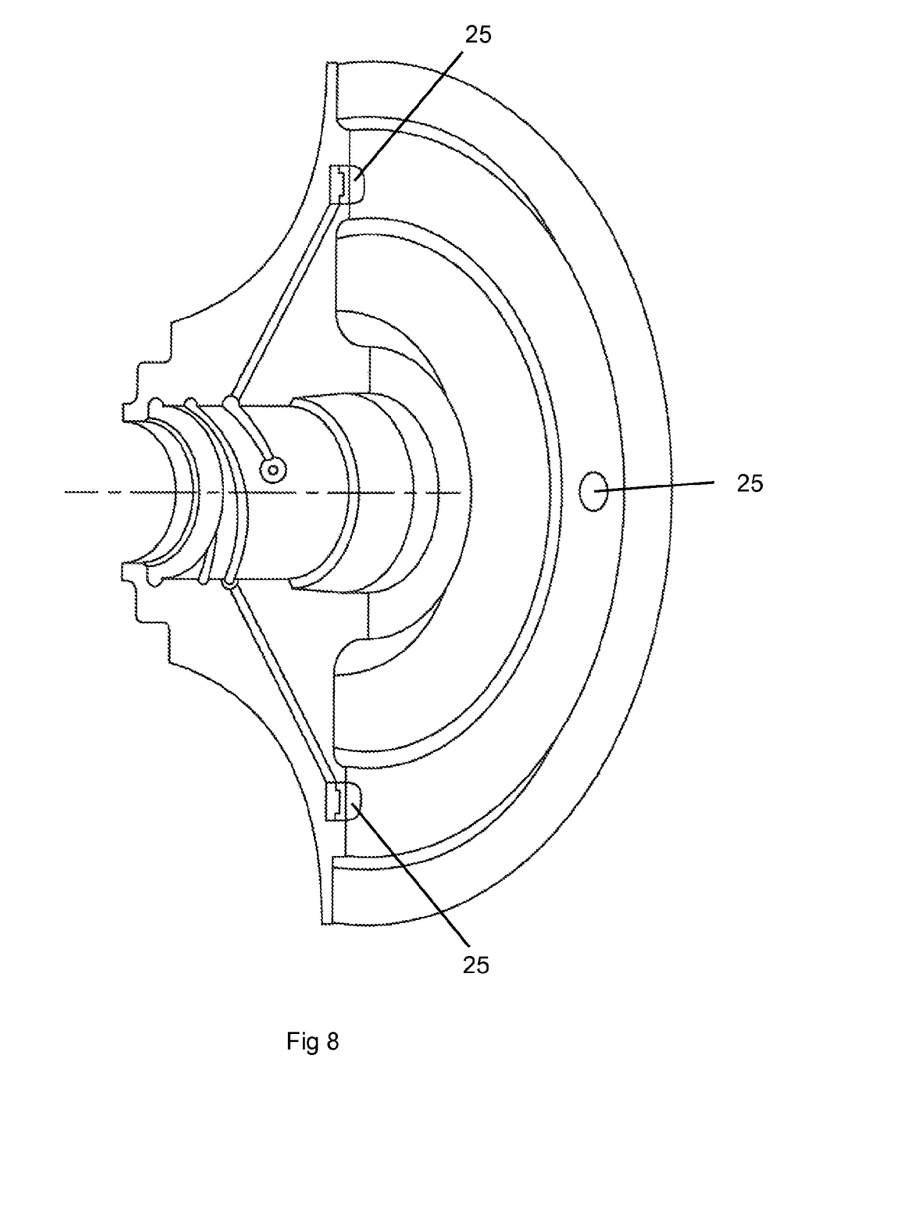
FIG. 8 shows a schematic view of a cut-away of the integral impeller and fuel injector with the helical grooves in the bore.

FIGS. 7 and 8 show the helical grooves 33 that feed the low pressure fuel to the radially directed fuel passages 15 and the nozzles. In the first embodiment of the present invention, there are four nozzles spaced about the rotor disk at about 90 degrees each. Each nozzle 25 is connected to a separate radial fuel passage 15, and each radial fuel passage 15 is connected to a separate helical groove 33 formed within the rotor disk 19. Each helical groove 33 extends from the spherical openings 27 and coils 180 degrees around the rotor disk before entering the bore fuel collection groove 46. FIG. 6 shows a schematic representation of this with two nozzles and two radial fuel passages each with a helical groove extending 180 degrees from the radial fuel passage entrance. As seen in FIG. 6, the helical passages supply fuel 180 degrees away from the imbalance vector.

The impeller and fuel injector of FIG. 1 operates as follows. Fuel is introduced into the bore of the impeller and centrifuged outward through the radial fuel passages that lead into two or more small diameter orifice nozzles. The very high centrifugal forces involved due to high rotational speeds of the turbine rotor shaft would produce very high fuel pressure. The high delta pressure across the fuel nozzles leads directly to rapid and effective fuel atomization and improved combustion. Also, because the fuel nozzles are rotating, there is a circumferentially uniform distribution of fuel, resulting in a pattern factor of zero. In addition, by channeling the fuel at the bore through the helical grooves, the mass imbalance inherent in the rotor can be counteracted by distributing more fuel to the fuel passage opposite the imbalance vector. The fuel is directed through the helical grooves or passages cut into the bore of the impeller. The greater volume of fuel that pools on the imbalance side of the bore will be forced to flow to the opposite side of the rotor. This greater volume of fuel will now fill a fuel passage substantially opposite the rotor imbalance vector. This will tend to "balance" the rotor. Thus, the helical grooves to channel the fuel around the inner bore of the rotor impeller of the present invention would solve the rotary imbalance problem for the Kroon rotary impeller injector.

A second embodiment of the present invention, shown in FIG. 4, allows for staging of the fuel. The first embodiment without staging, shown in FIG. 1, feeds fuel to four fuel nozzles simultaneously. At low power the total fuel flow rate is low. This low flow is divided among the four fuel nozzles. Low fuel pressure is required at these conditions in order to get the very low flow rate required of each nozzle. This low fuel pressure might result in atomization and ignition issues during start-up of the engine. The fuel pressure could be increased by a factor of 4 or 5 if the flow was fed to two fuel nozzles instead of four. This is achieved by staging the fuel delivery in the second embodiment of the present invention as shown in FIG. 4. The fuel introduced into the bore of the impeller would first pool in the forward or primary fuel collection groove 41 and then flow to the two primary fuel nozzles during operation at idle and low fuel flow rates. At low fuel flow rates the fuel would be confined to this primary groove only feeding the primary fuel nozzles only. As the fuel flow rate increases the fuel will overflow the first primary fuel collection groove 41 and pool in the aft secondary fuel collection groove 43 as well. This will start feeding the two remaining secondary fuel nozzles. At this point all four fuel nozzles would be flowing. The helical grooves described previously for imbalance compensation are not shown for simplicity. But they could be incorporated by means of additional parts or more complicated machining of the fuel passages. This would be necessary in order to prevent the primary and secondary fuel flow systems from communicating with each other.

I claim the following:

1. A centrifugal impeller for a gas turbine engine comprising: a rotor disk with a plurality of centrifugal compressor blades extending there from; a central bore extending through the rotor disk; a fuel nozzle secured to a rear side of the rotor disk and oriented to inject fuel in a rearward direction; and, a substantially radial fuel passage extending from the central bore through the rotor disk to the fuel nozzle such that a fuel supplied into the central bore flows into the radial fuel passage and through the fuel nozzle, the radial fuel passage increases the fuel pressure due to rotation of the impeller.

2. The centrifugal impeller of claim 1, and further comprising:
   a helical groove formed within the central bore of the rotor disk, one end of the helical groove connected to the radial fuel passage.

3. The centrifugal impeller of claim 2, and further comprising:
   the helical groove extends around the central bore about 180 degrees from the radial fuel passage such that an inherent imbalance in the rotor disk is lessened by channeling fuel from one side of the central bore to the other side.

4. The centrifugal impeller of claim 1, and further comprising:
   a plurality of nozzles each located on the rear side of the rotor disk and facing the combustor;
   a plurality of radial fuel passages, each passage being connected to a separate fuel nozzle; and,
   a plurality of helical grooves formed in the central bore of the rotor disk, each helical groove being connected to a separate radial fuel passage.

5. The centrifugal impeller of claim 1, and further comprising:
   the fuel nozzle is a fuel nozzle insert having a plurality of small diameter orifices therein, the fuel nozzle insert being secured within an opening formed within the rear face of the rotor disk, the opening being connected to the radial fuel passage.

6. The centrifugal impeller of claim 5, and further comprising:
   the fuel nozzle insert being secured to the opening by brazing.

7. The centrifugal impeller of claim 1, and further comprising:
   the fuel nozzle being oriented such that fuel is injected into a combustor chamber of the gas turbine engine is substantially an axial direction of the engine.

8. The centrifugal impeller of claim 1, and further comprising:
   the fuel nozzle is located outside of the combustion chamber.

9. The centrifugal impeller of claim 2, and further comprising:
   a spherical opening formed in the central bore at an entrance to the radial fuel passage and at the end of the helical groove.

10. The centrifugal impeller of claim 1, and further comprising:
    a primary annular groove formed within the central bore and connected to a first fuel nozzle through a first radial fuel passage;

a secondary annular groove formed within the central bore and located in a down stream direction from the primary annular groove and slightly radial outward direction from the primary annular groove, the secondary annular groove being connected to a second fuel nozzle through a second radial fuel passage such that fuel collected within the primary annular groove all flows into the first radial fuel passage below a certain rotational speed, and some of the fuel flows into the secondary annular groove at or above the certain rotational speed.

11. The centrifugal impeller of claim 10, and further comprising:

the secondary annular groove is separated from the primary annular groove by a lip.

12. The centrifugal impeller of claim 10, and further comprising:

a plurality of first radial fuel passages and first fuel nozzles connected to the primary annular groove; and, a plurality of second radial fuel passages and second fuel nozzles connected to the secondary annular groove.

13. The centrifugal impeller of claim 10, and further comprising:

the fuel nozzles are each a fuel nozzle insert having a plurality of small diameter orifices therein, the fuel nozzle insert being secured within an opening formed within the rear face of the rotor disk, the opening being connected to the radial fuel passage.

14. The centrifugal impeller of claim 13, and further comprising:

the fuel nozzle insert being secured to the opening by brazing.

15. The centrifugal impeller of claim 10, and further comprising:

the fuel nozzle being oriented such that fuel is injected into a combustor chamber of the gas turbine engine is substantially an axial direction of the engine.

16. A process for injecting a fuel into a combustor of a gas turbine comprising a rotor disk with a plurality of centrifugal compressor blades extending there from; a central bore extending through the rotor disk; a fuel nozzle secured to a rear side of the rotor disk and oriented to inject fuel in a rearward direction; and, a substantially radial fuel passage extending from the central bore through the rotor disk to the fuel nozzle such that a fuel supplied into the central bore flows into the radial fuel passage and through the fuel nozzle, the radial fuel passage increases the fuel pressure due to rotation of the impeller, the process comprising the steps of: rotating the centrifugal compressor to compress air to be burned in the combustor; supplying a fuel under relatively lower pressure into the central bore of the rotor disk of the centrifugal compressor; collecting the low pressure fuel from the central bore into the radial fuel passage formed within the rotor disk; pressurizing the fuel within the radial fuel passage by restricting the discharge of fuel from the fuel passage; and, directing the relatively high pressure fuel from the radial fuel passage through a fuel nozzle and into the combustor of the engine.

17. The process for injecting a fuel into a combustor of claim 16, and further comprising the step of:

balancing the centrifugal rotor disk by channeling the fuel along a helical groove from one side of the central bore to the other side.

18. The process for injecting a fuel into a combustor of claim 16, and further comprising the step of:

the step of collecting the low pressure fuel from the central bore into a radial fuel passage formed within the rotor disk includes collecting the fuel into a plurality of radial fuel passages spaced about the rotor disk.

19. The process for injecting a fuel into a combustor of claim 18, and further comprising the step of:

balancing the centrifugal rotor disk by channeling the fuel along a plurality of helical grooves with each radial fuel passage being connected to a separate helical groove from one side of the bore to the other side.

20. The process for injecting a fuel into a combustor of claim 16, and further comprising the step of:

detecting an amount of fuel collected within the radial fuel passage and regulating the amount of relatively low pressure fuel supplied to the central bore such that the amount of fuel collected within the radial fuel passage remains within an acceptable range.

21. The process for injecting a fuel into a combustor of claim 16, and further comprising the step of:

collecting the relatively low pressure fuel in a primary annular groove connected to a first fuel nozzle and supplying all of the fuel collected within the primary annular groove at a rotational speed below a certain speed.

22. The process for injecting a fuel into a combustor of claim 21, and further comprising the step of:

collecting some of the fuel collected in the primary annular groove in a secondary annular groove connected to a second fuel nozzle at a rotational speed at or above the certain speed, some of the fuel from the primary annular groove spilling over into the secondary annular groove at the certain speed.

* * * * *